(12) United States Patent
Scism (10) Patent No.: US 7,866,880 B1
(45) Date of Patent: Jan. 11, 2011

(54) HOPPER WITH MEASURING GUIDE

(76) Inventor: John A. Scism, P.O. Box 462, Bennettsville, SC (US) 29512

( * ) Notice: Subject to any disclaimer, the term of this patent is extended or adjusted under 35 U.S.C. 154(b) by 908 days.

(21) Appl. No.: 11/750,115

(22) Filed: May 17, 2007

Related U.S. Application Data (60) Provisional application No. 60/915,748, filed on May 3, 2007.

(51) Int. Cl.
*G01F 19/00* (2006.01)
*B01F 15/00* (2006.01)

(52) U.S. Cl. .......................... 366/142; 73/427; 215/366

(58) Field of Classification Search ............ 366/30–37, 366/142; 222/26, 29, 157, 158; 73/427; 215/365, 366; 220/501, 505; 116/209, 227
See application file for complete search history.

(56) References Cited

U.S. PATENT DOCUMENTS

| 129,330 A | 7/1872 | Foote |
| 1,478,751 A | 12/1923 | MacLean |
| 1,700,773 A | 2/1929 | Miller |
| 1,848,959 A | 3/1932 | Longenecker |
| 1,986,864 A | 1/1935 | Tolley |
| 4,157,769 A | 6/1979 | Radel |
| 4,940,335 A | 7/1990 | Gibson |
| 5,425,329 A * | 6/1995 | Pollock ...................... 116/227 |
| 5,605,397 A | 2/1997 | Oberg et al. |
| 6,817,242 B1 * | 11/2004 | Moran ......................... 73/313 |
| 6,905,048 B2 | 6/2005 | Harris |
| 2002/0196701 A1 * | 12/2002 | Mastbrook .................. 366/142 |

* cited by examiner

*Primary Examiner*—Walter D Griffin
*Assistant Examiner*—Timothy Cleveland
(74) *Attorney, Agent, or Firm*—Womble Carlyle Sandridge & Rice PLLC (57) ABSTRACT

A hopper for measuring a predetermined amount of aggregate. The hopper has a body having an open top and plurality of walls, at least one guide extending between at least two of the plurality of walls, and an indicator to provide indication that the hopper contains a first and a second predetermined volume of aggregate.

18 Claims, 9 Drawing Sheets

HOPPER WITH MEASURING GUIDE

CROSS-REFERENCE TO RELATED APPLICATION

This application claims the benefit of U.S. Provisional Application No. 60/915,748 which was filed on May 3, 2007. The entire content of the above-referenced provisional application is hereby incorporated by reference as if presented herein in its entirety.

BACKGROUND OF THE INVENTION

The present invention relates generally to a hopper for measuring and loading aggregate and other particulate materials, and in particular to a hopper having at least one guide to provide indication that the hopper contains a predetermined amount of aggregate.

It is known that concrete or mortar can be prepared by loading a batch mixer with aggregate (e.g., granular materials such as sand, gravel, crushed stone, etc.), cement, water, and/or other ingredients to form a properly proportioned mixture. The ingredients for the mixture must be added to the batch mixer in appropriate proportions to meet the specifications for the particular type of cement or mortar that is desired. Accurate measurement and proper proportioning of the ingredients is important to achieve high quality concrete or mortar.

Control of the accuracy of the aggregate material added to the batch mixer is particularly difficult. Usually, the aggregate is sand or gravel delivered to a construction site by the truck load and dumped into a pile. Typically, aggregate is loaded into the mixer with a shovel or front loader. The amount of aggregate per shovel or load varies throughout the loading of the mixer. As such, a need exists for a system or mechanism for measuring and loading a predetermined amount of aggregate so that accuracy of the batch proportions is improved. It is extremely important with colored mortar that batched proportions are consistent.

SUMMARY OF THE INVENTION

In general, the present invention is directed to a hopper for measuring a predetermined amount of aggregate. The hopper comprises a body having an open top and a plurality of walls. The plurality of walls comprises a bottom wall, a first side wall, a second side wall, a front wall, and a back wall. At least one guide extends between at least two of the plurality of walls. The at least one guide has a top surface at a first elevation and a bottom surface at a second elevation. At least one indicator provides an indication within the hopper of at least a first predetermined volume of aggregate when the hopper has a fill level approximately aligned with the top surface of the guide. The at least one indicator provides indication that the hopper contains a second predetermined volume of aggregate when the hopper has a fill level approximately aligned with the bottom surface of the guide.

In another aspect, the invention is generally directed to a method of mixing a predetermined amount of aggregate with cement. The method comprises providing a hopper for measuring a predetermined amount of aggregate. The hopper comprises a body having an open top, a plurality of walls, and at least one guide extending between at least two of the plurality of walls. The guide has a top surface at a first elevation and a bottom surface at a second elevation. The hopper comprises at least one indicator for measuring at least a first and a second predetermined volume of aggregate. The method further comprises filling the hopper with a predetermined amount of aggregate according to the at least one indicator of the hopper, discharging the predetermined amount of aggregate from the hopper, and mixing the predetermined amount of aggregate with cement.

In another aspect, the invention is generally directed to a hopper for measuring a predetermined amount of aggregate. The hopper comprises a body having an open top and a plurality of walls. The plurality of walls comprises a bottom wall, a first side wall, a second side wall, a front wall, and a back wall. At least two guides extend between the back wall and the front wall. The guides are generally in a parallel planar relationship and are vertically aligned in the hopper. The guides each have a top surface at a first elevation and a bottom surface at a second elevation. At least one indicator is along one of the first and second side walls. The indicator comprises at least two colored segments on the outside surface of the side wall and a line of demarcation between the colored segments. The line of demarcation is at an elevation above the bottom wall even with the bottom surfaces of the at least two guides for indicating that the hopper contains a first predetermined volume of aggregate when the hopper has a fill level even with the line of demarcation.

BRIEF DESCRIPTION OF THE DRAWINGS

Corresponding parts are designated by corresponding reference numbers throughout the drawings.

DESCRIPTION OF EXEMPLARY EMBODIMENTS

Figure 2:
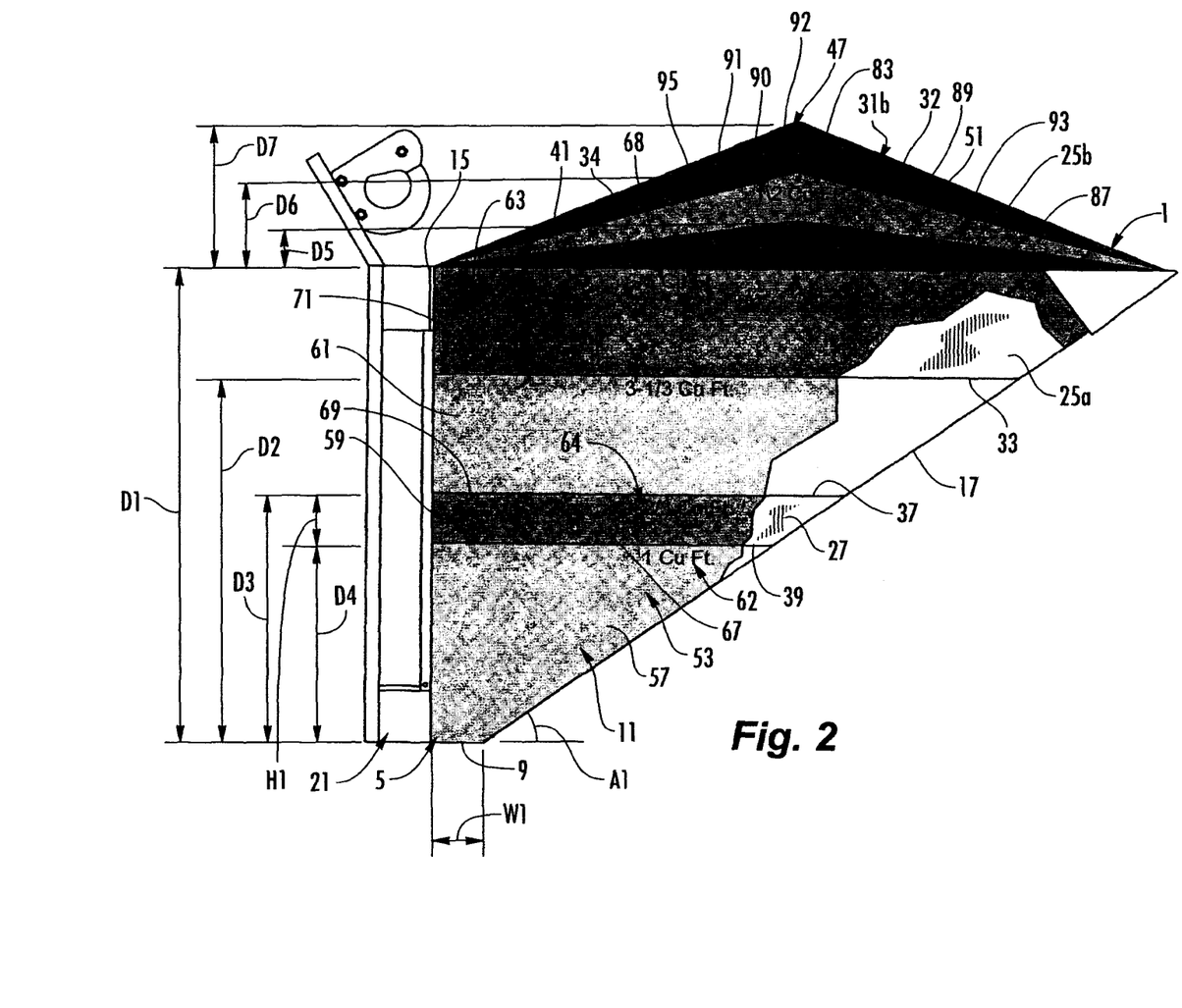
FIG. 2 is a side view of the hopper of FIG. 1.
Figure 3:
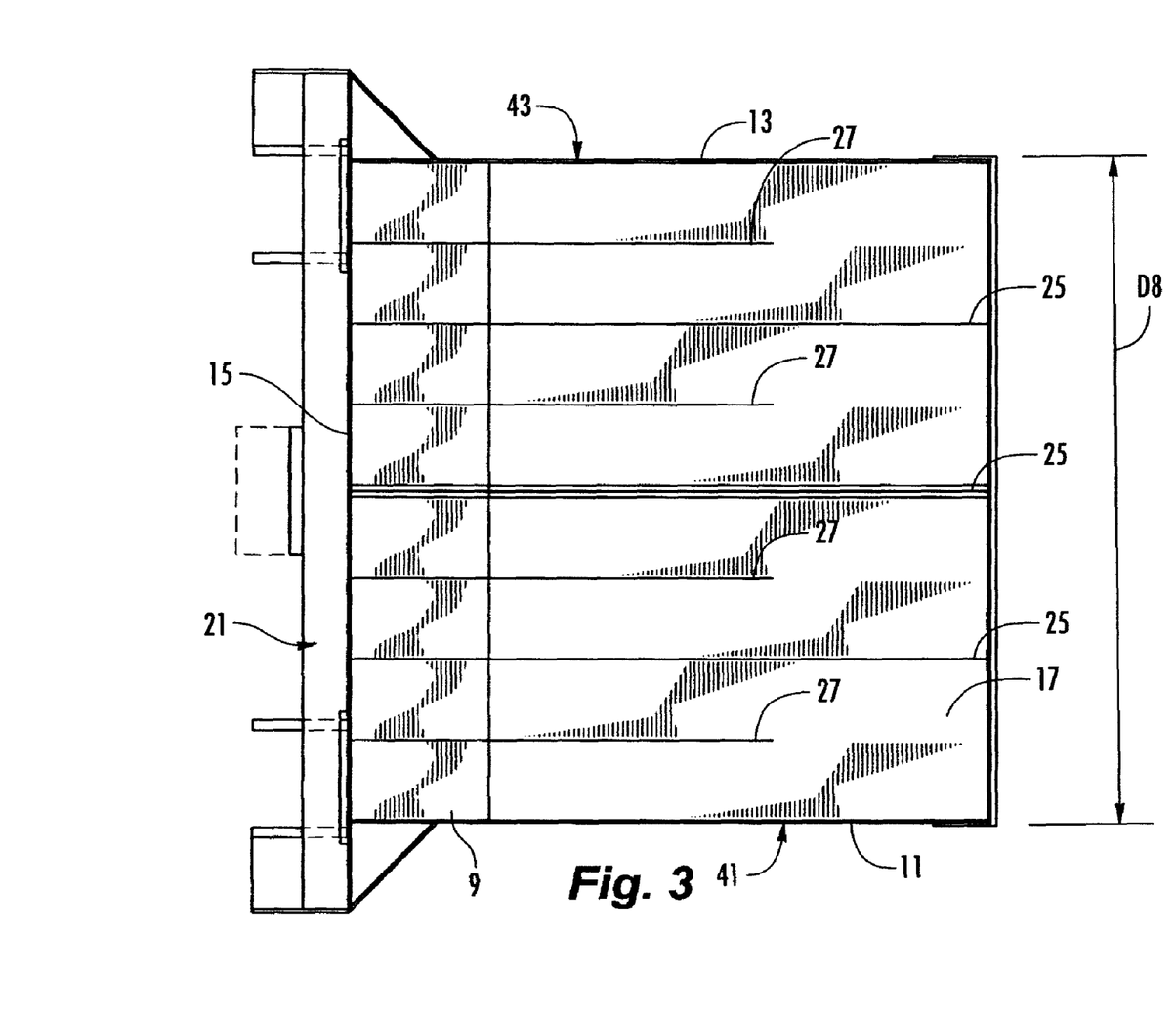
FIG. 3 is a top view of the hopper of FIG. 1.
Figure 4:
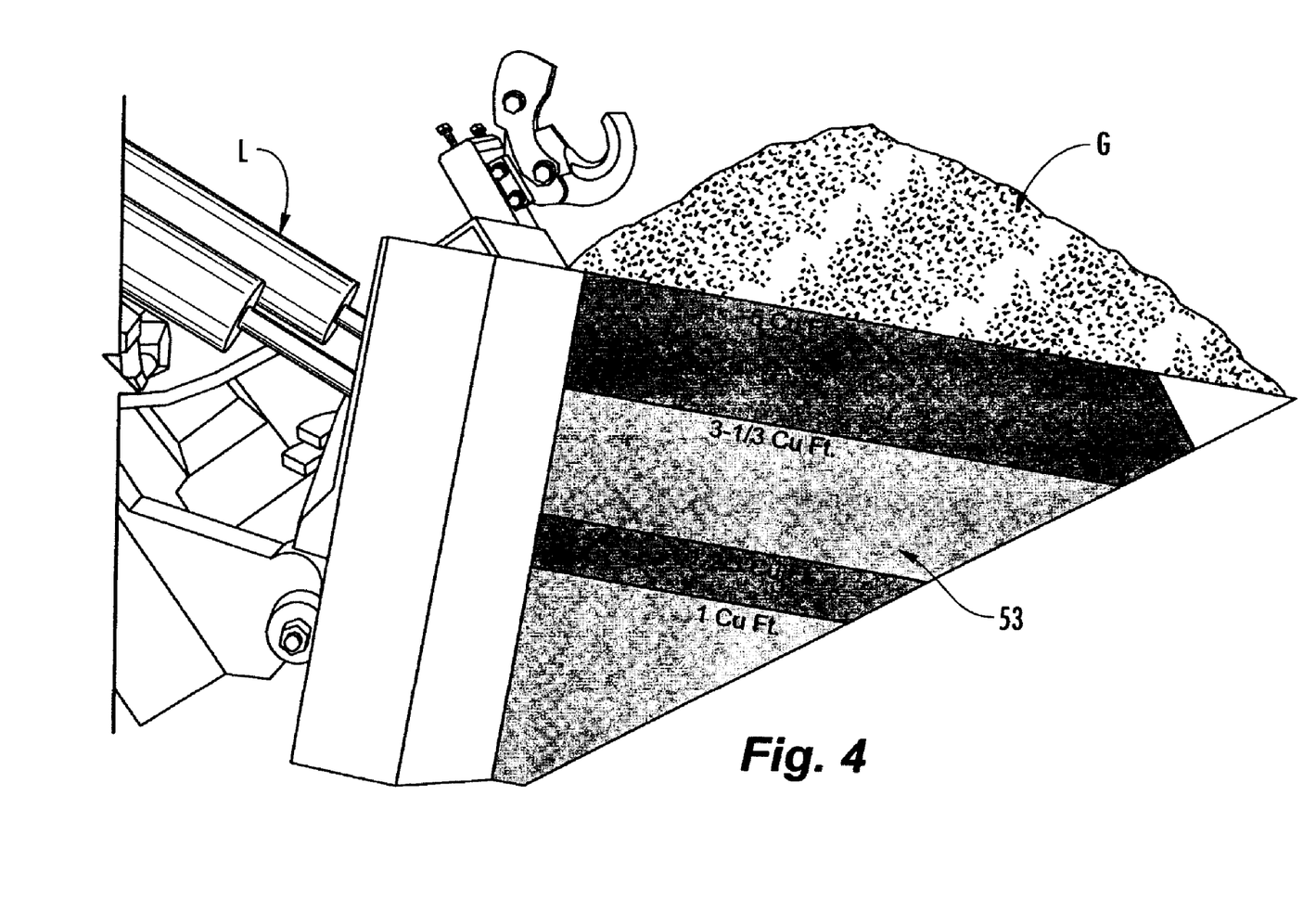
FIG. 4 is a side view of the hopper of FIG. 1 overfilled with aggregate.
Figure 5:
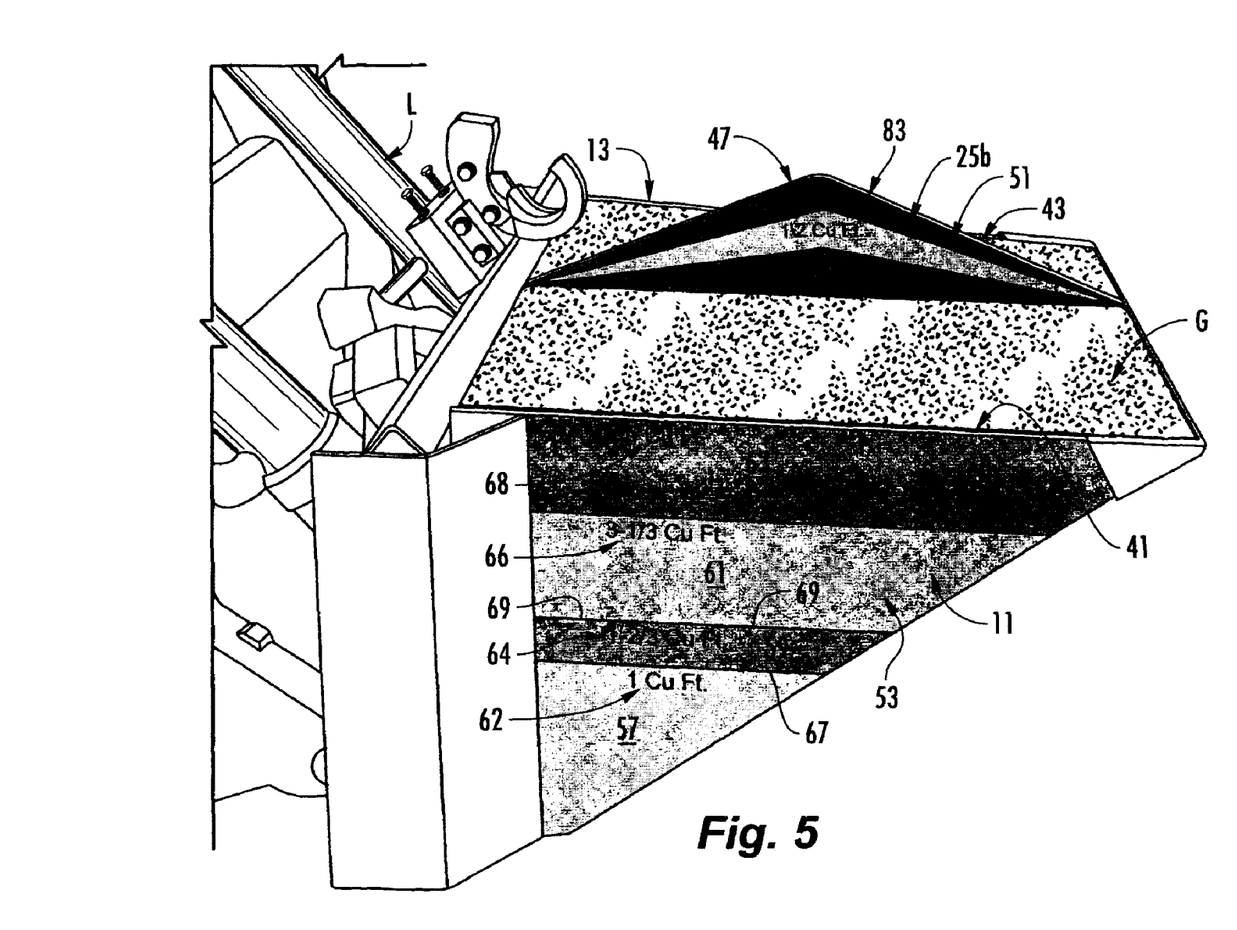
FIG. 5 is a side view of the hopper of FIG. 1 filled with a predetermined amount of aggregate.

Referring now to FIGS. 1-6, a first example embodiment of a hopper 1 for measuring a predetermined amount of aggregate is shown. In this embodiment, the hopper 1 can be sized for transporting a large quantity of aggregate or other particulate material (e.g., gravel G as shown in FIGS. 4 and 5). The hopper 1 is particularly useful in measuring a predetermined amount of aggregate G to be delivered to a batch mixer or other device (e.g., mixer M shown in FIG. 7) for mixing with other ingredients (e.g., cement, sand, water, etc.) such as for the preparation of concrete or mortar. It is understood that the hopper 1 may be used to measure other materials than those listed herein without departing from the invention.

In the illustrated embodiment, the hopper 1 comprises a body 5 having an open top and a plurality of walls including a bottom wall 9, a first side wall 11, a second side wall 13, a back wall 15, and a front wall 17. In the illustrated embodiment, the back wall 15 is generally orthogonal to the bottom wall 9 and the front wall 17 is generally oblique relative bottom wall. In one embodiment, the front wall 17 has an angle of incline A1 (FIG. 2) relative to the bottom wall 9. In the embodiment of FIGS. 1-6, the hopper 1 generally includes a bracket 21 attached to the back wall 15 for attaching the hopper 1 to lifting machinery such as a front loader L.

In one embodiment, the hopper 1 can include three upper guides 25 and four lower guides 27 respectively extending between the back wall 15 and the front wall 17 of the body 5. It is understood that the hopper 1 can include less than or more than three upper guides 35 and less than or more than four lower guides without departing from the invention. The upper guides 25 and lower guides 27 are generally parallel to the first and second side walls 11, 13 and are laterally spaced between the side walls. In the illustrated embodiment, the upper and lower guides 25, 27 are generally rectangular plates with an inclined front edge having an angle of incline corresponding approximately to the angle of incline A1 of the front wall 17. In one embodiment, the guides 25, 27 are fixedly attached to the back wall 15 and the front wall 17 of the hopper 1 by conventional attachment methods (e.g., welding, fusing, by adhesives, fasteners, etc.), although it is also possible to adjustably mount the guides to the body 5 as needed.

Figure 1:
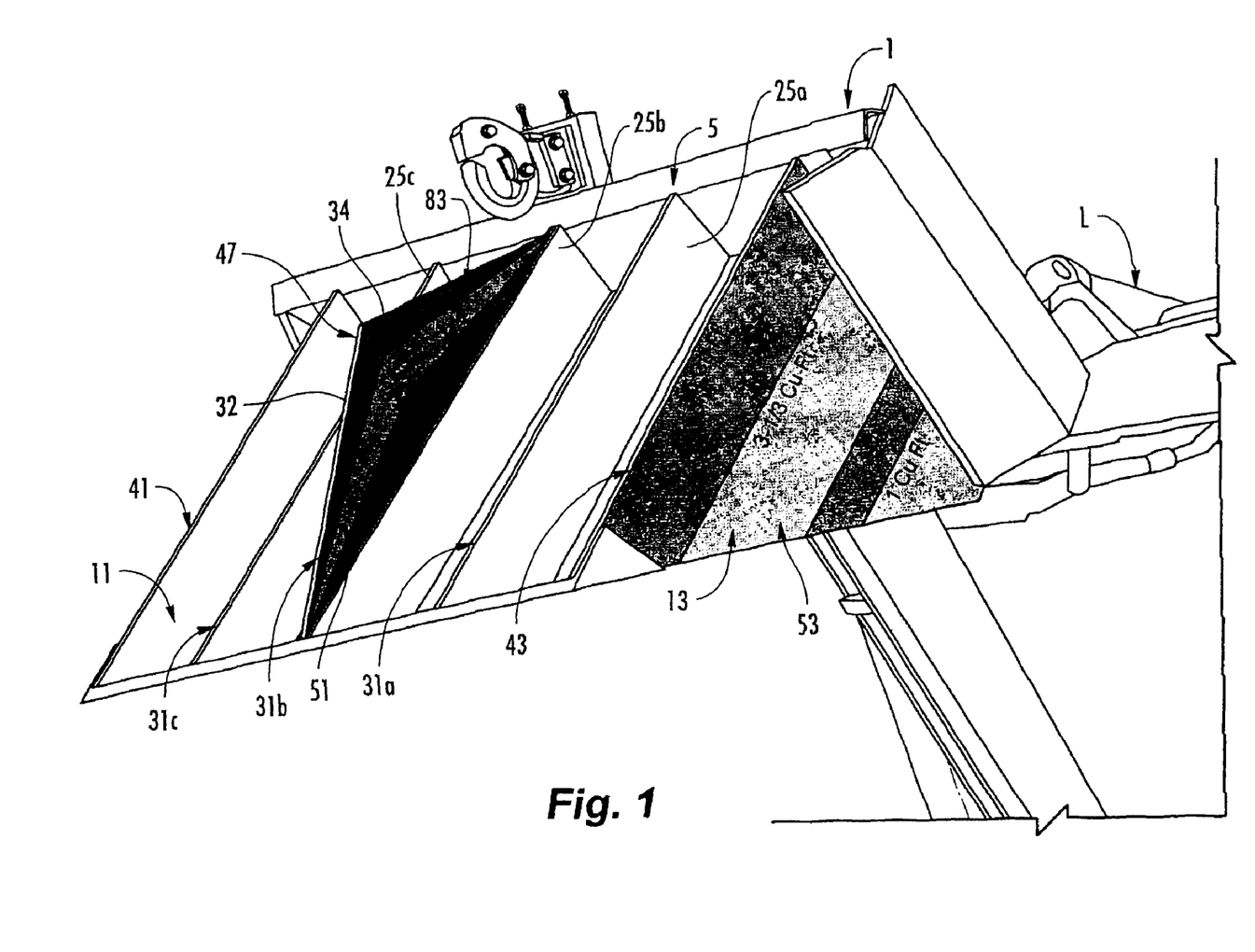
FIG. 1 is a perspective view of a hopper of one example embodiment of the present invention.

As shown in FIGS. 1 and 3, the upper guides 25 generally can comprise a middle guide (designated 25b) located approximately equidistant from the side walls 11, 13 and two outer guides (designated 25a and 25c) respectively laterally spaced between one of the side walls 11, 13 and the middle guide. The two outer upper guides 25a, 25c have a top surface 31a, 31c spaced above the bottom wall 9 a first distance D1. In the illustrated embodiment, the top surface 31a, 31c of each of the two outer guides 25a, 25c is generally at the same elevation above the bottom wall 9 as top surfaces 41, 43 of the opposed side walls 11, 13, although their elevations also can be varied as needed. The three upper guides 25 have a bottom surface 33 spaced above the bottom wall a second distance D2.

In one embodiment, the middle upper guide 25b includes a portion 51 that protrudes above the upper surfaces 41, 43 of the side walls 11, 13. In the illustrated embodiment, the upper surface 31b of the middle upper guide 25b includes two inclined surfaces 32, 34 forming an opener, generally indicated 47, formed at the peak of the two inclined surfaces. The opener 47 is useful in opening bags of material (e.g., cement) that can be added to the hopper 1.

The four lower guides 27 are each generally aligned at the same vertical distance from the bottom wall 9 of the hopper 1. As shown in FIG. 3, the lower guides 27 are laterally spaced between the side walls 11, 13 and the upper guides 25. The four lower have a top surface 37 spaced above the bottom wall 9 a first distance D3 and a bottom surface 39 spaced above the bottom wall a second distance D4. It is understood that the upper and lower guides 25, 27 can be otherwise shaped and arranged without departing from the invention.

As shown in FIGS. 1-6, the side walls 11, 13 each generally include an indicator 53 for indicating the approximate fill level of the hopper 1, generally corresponding with a predetermined volume of aggregate G. In the illustrated embodiment, the indicator 53 is shown with four colored segments 57, 59, 61, 63 of the external surface of each of the side walls 11, 13 indicating four different fill levels and corresponding predetermined volumes. As shown in FIGS. 2-6, the indicator 53 on the first side wall 11 is described herein, but another separate indicator on the second side wall 13 also can be provided and may be the same or of a different scale from indicator 53, without departing from the spirit and scope of the invention. The colored segments 57, 59, 61, 63 include two alternating colors to indicate a demarcation 67, 69, 71 between adjacent segments. For example, the first (bottom) segment 57 and the third segment 61 can be painted a first color (e.g., blue) while the second segment 59 and fourth (upper) segment 63 can be painted a second and/or third colors (e.g., red, yellow, etc.) that contrasts with the first color. Such lines of demarcation 67, 69, 71 between each adjacent colored segment (e.g., 57 and 59, 59 and 61, 61 and 63) of the indicator 53 and the top surfaces 41, 43 of the side walls further can be used to represent approximate fill lines for the total approximate volumes indicated by volume indicia 62, 64, 66, 68, respectively, on the segments below each demarcation line or top surface.

In the illustrated embodiment, the first, lower segment 57 of the indicator 53 comprises the portion of the surface area of the side wall 11 below the elevation of the bottom surfaces 39 of the lower guides 27. The second segment 59 of the indicator that is above the first segment 57 includes the portion of the surface area of the side wall 11 extending between the elevation of the bottom surfaces 39 of the lower guides 27 and the elevation of the top surfaces 37 of the lower guides (e.g., corresponding to a height H1 of the lower guides). The third segment 61 of the indicator 53 that is above the second segment 59 includes the portion of the surface area of the side wall 11 extending between the elevation of the top surfaces 37 of the lower guides 27 and the elevation of the bottom surfaces 33 of the upper guides 25. The fourth segment 63 of the indicator 53 that is above the third portion 61 includes the upper portion of the surface area of the side wall 11 that is above the elevation of the bottom surface 33 of the upper guide 25.

Based on the desired amount and type of aggregate G being used in the concrete mixture, a volume of aggregate less than a full hopper 1 may be desired. Accordingly, varying volume or fill levels can be indicated within the hopper. For example, a fill level corresponding with the line 67 between the first and second segments 57, 59 of the indicator 53 can indicate that a volume of approximately 1 cu. Ft. of aggregate is in the hopper 1, while a fill level corresponding with the line 69 between the second and third segments 59, 61 of the indicator 53 can indicate that a volume of approximately 1⅔ cu. Ft. of aggregate is in the hopper 1. Still further, a fill level corresponding with the line 71 between the third and fourth segments 61, 63 of the indicator 53 can indicate that a volume of approximately 2-3⅓ cu. Ft. of aggregate is in the hopper 1, and a fill level corresponding with the top surfaces 41, 43 of the side walls 11, 13 and the top surfaces 31a, 31c of the outer upper guides 25a, 25c can indicate that a volume of approximately 5 cu. Ft. or more of aggregate is in the hopper. It is also understood that the size of each segment 57, 59, 61, 63 of the indicator 53 and the specific volumes indicated by the volume indicia 62, 64, 66, 68 on each segment may vary from what is shown and described herein without departing from the invention. Further, the hopper 1 could include an indicator 53 with more or less than four segments, and the indicator may be on other walls (e.g., front wall 17, back wall 15, etc.) in addition to or instead of the side walls 11, 13 without departing from the invention.

As shown in FIGS. 1 and 2, the middle upper guide 25b further can have an indicator 83 on the portion 51 of the guide that that extends above the side walls 11, 13 of the body 5. In one embodiment, indicator 83 is located on both faces of the middle upper guide 25b, but the indicator could be used on one side of the middle upper guide or may be omitted without departing from the invention. Each indicator 83 on the middle upper guide 25b includes three colored segments including a lower segment 87, a middle segment 89, and an upper segment 91. The middle segment 89 is painted a color (e.g., red) that contrasts with the color (e.g., blue) of the upper and lower segments 87, 91. The demarcation lines 93, 95 between contrasting colors of the adjacent segments 87, 89, 91 and the top surface 31*b* on the middle guide 25*b* indicate to a user an approximate fill line above the side walls 11, 13 needed to add a corresponding additional volume to the hopper 1 by heaping the aggregate onto a full hopper. As shown in FIG. 2, the peak of the lower segment 87 is spaced above the top surfaces 41, 43 of the side walls 11, 13 a distance D5, the peak of the middle segment 89 is spaced above the top surfaces of the side walls a distance D6, and the peak of the upper segment 91 is spaced above the top surfaces of the side walls a distance D7. The predetermined volumes of each segment are indicated by volume indicia 88, 90, 92 on each of the three segments 87, 89, 91 that lists the approximate additional volumes of aggregate respectively corresponding to fill levels at each demarcation line 93, 95 and the top surface 31*b*.

In the illustrated embodiment, the distance D1 is equal to approximately 18¾ inches, the distance D2 is equal to approximately 14¾ inches, the distance D3 is equal to approximately 10¼ inches, the distance D4 is equal to approximately 7⅛ inches, the distance D5 is equal to approximately 2 inches, the distance D6 is equal to approximately 4 inches, and the distance D7 is equal to approximately 6 inches. The front wall 17 is angled at an angle A1 of approximately 30 degrees relative to the bottom wall 9 and the bottom wall has a width W1 of approximately 3¼ inches. The side walls 11, 13 are spaced apart a distance D8 (FIG. 3) of approximately 30 inches. It is understood that all dimensional information presented herein is exemplary only and is not intended to limit the scope of the invention. Further, the dimensions of the hopper 1 may vary based on the overall volume of the hopper. For example, the hopper 1 could be sized to hold more or less than 5 cu. Ft. of aggregate without departing from the invention.

In use, the hopper 1 may be at least partially filled with aggregate G for transporting the aggregate to the mixer M. The bracket 21 on the back wall 15 of the hopper 1 is attached to the front loader L to secure the hopper to the front loader. The hopper 1 is used to scoop aggregate G from a pile of aggregate (not shown) so that the hopper is overfilled with aggregate as shown in FIG. 4. The hopper 1 is then generally tilted so that excess aggregate G above the fill line of the desired predetermined amount is removed from the hopper and the fill level of the hopper is reduced to the desired level. As shown in FIG. 5, the desired full fill amount of aggregate G in the hopper is about 5 cu. Ft. corresponding to the fill level at approximately the top surfaces 41, 43 of the side walls and the top surfaces 31 of the upper guides 25. It is understood that more or less aggregate G may be removed from the overfilled hopper 1 of FIG. 4 if the desired volume of aggregate is less or more than 5 cu. Ft. For example, the fill level could be lowered from the overfilled hopper 1 of FIG. 4 to correspond with a fill level indicated by the one of the other lines, i.e., line 71 indicating the 3⅓ cu Ft. fill level or other fill level(s) as required for the specification of the mortar or concrete mix that is used.

Figure 6:
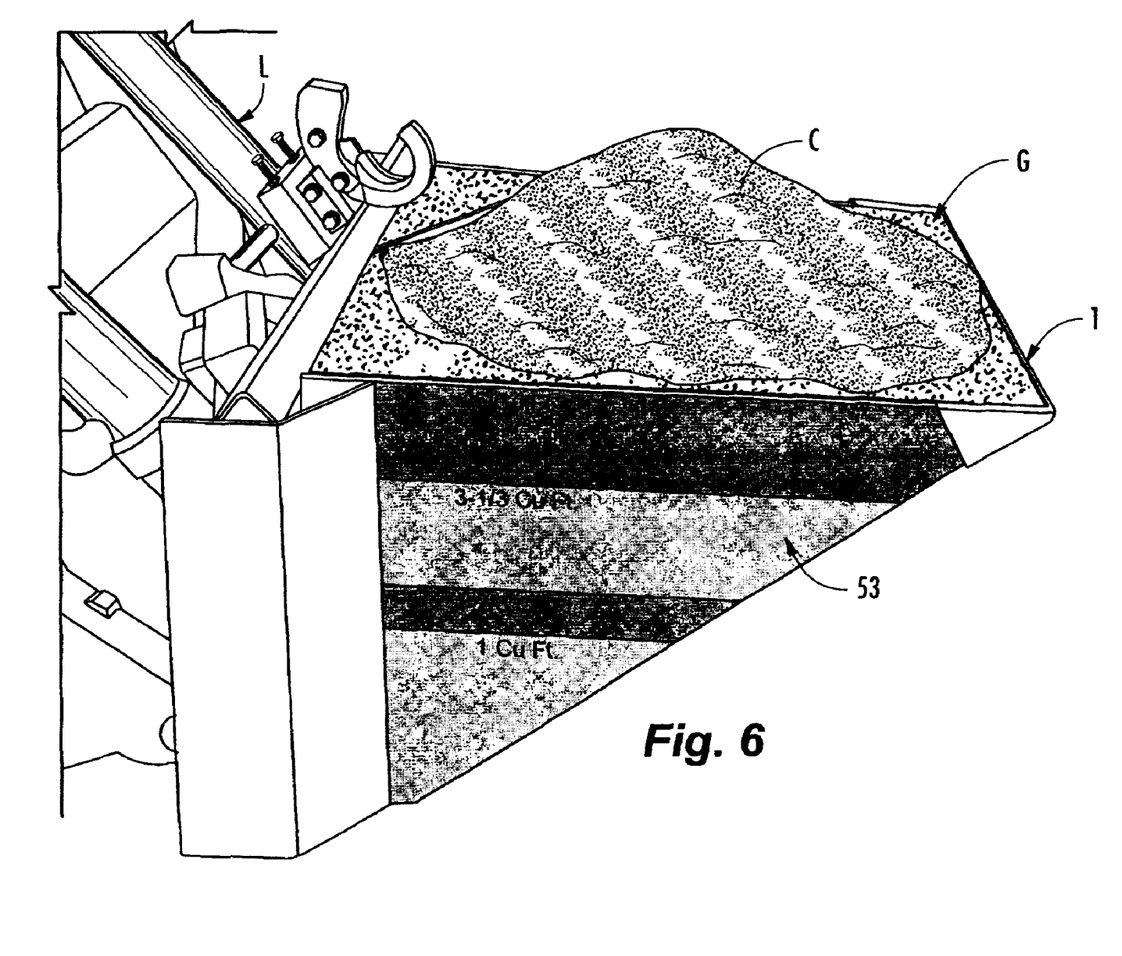
FIG. 6 is a view similar to FIG. 4 but with cement added to the hopper.
Figure 7:
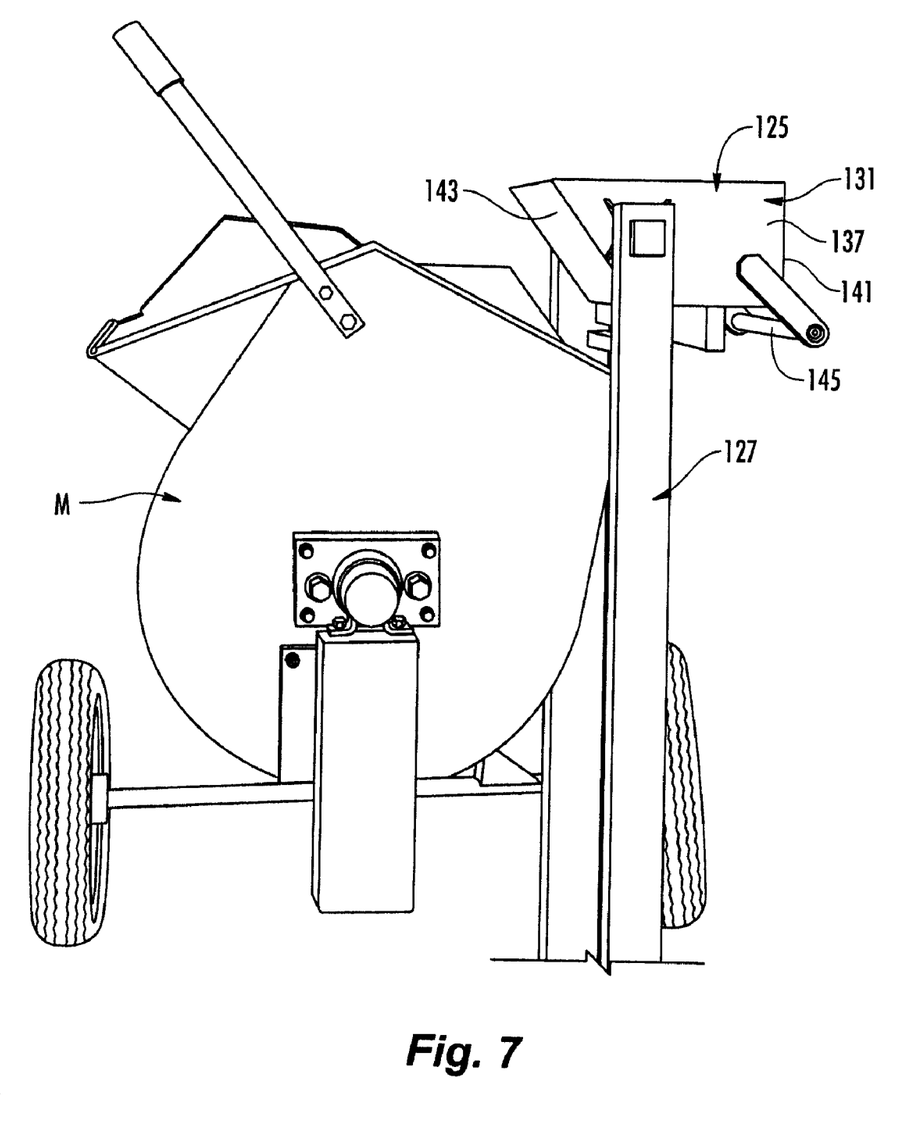
FIG. 7 is a perspective view of a hopper of another example embodiment of the present invention.
Figure 8:
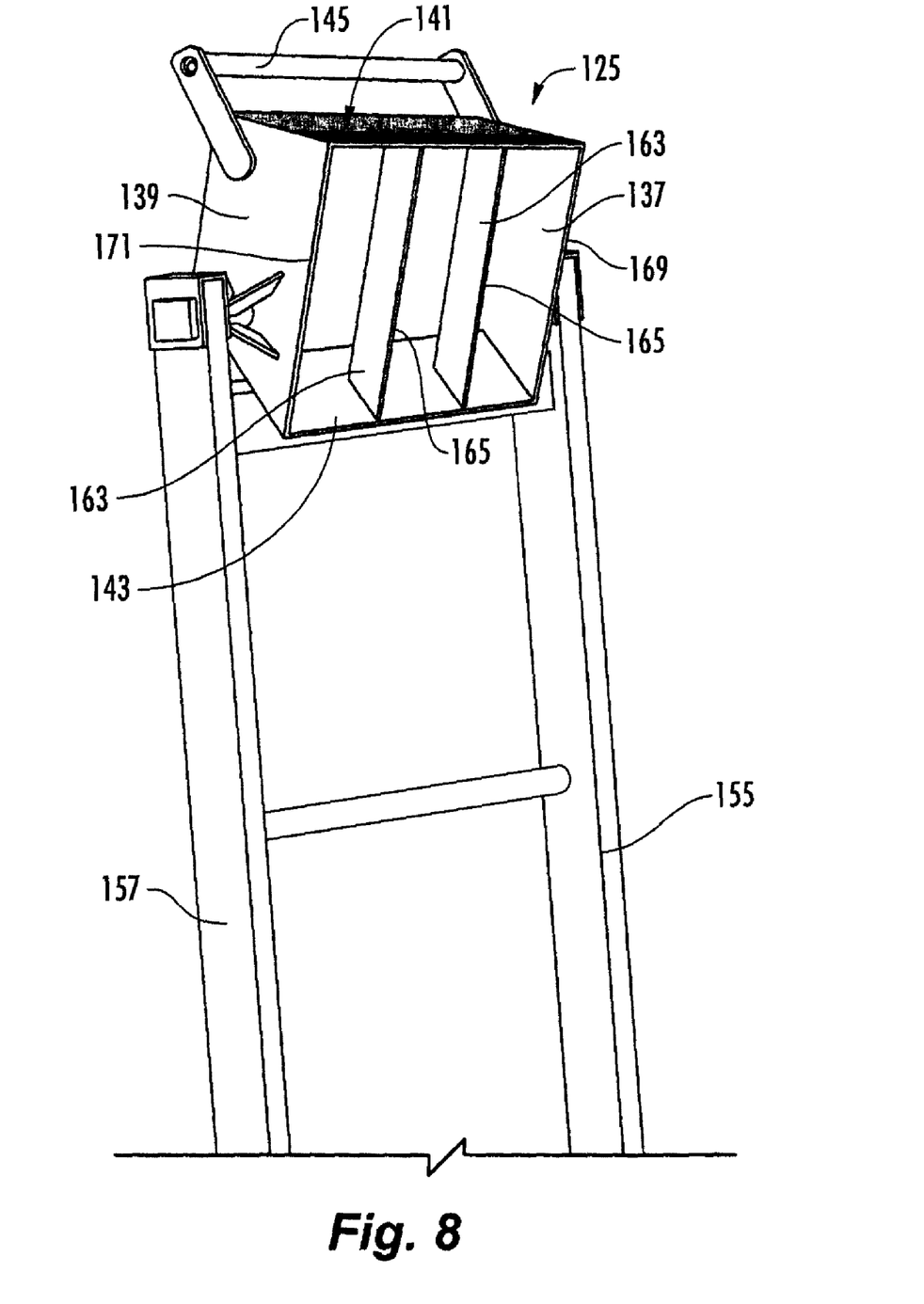
FIG. 8 is a perspective view of the hopper of FIG. 7 in a rotated position.
Figure 9:
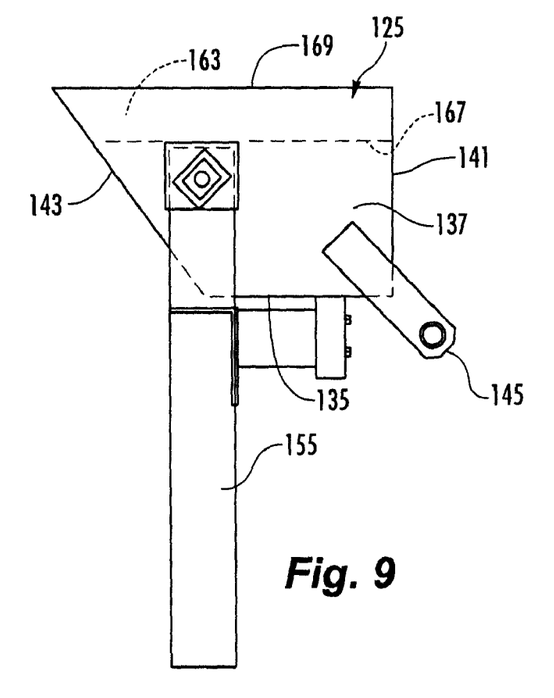
FIG. 9 is a side view of the hopper of FIG. 7.

After lowering the fill level of aggregate G to the desired fill level corresponding with the desired predetermined volume of aggregate, additional ingredients or materials (e.g., cement, sand, etc.) can be added to the hopper 1. As shown in FIG. 6, cement C has been added to the hopper 1 by dropping a bag or container (not shown) of a predetermined volume of cement onto the opener 47 (FIG. 5) on the middle upper guide 25*b* to puncture the bag and remove the cement from the bag. Next, the hopper 1 is moved to a mixer and the predetermined amount of aggregate G and any additional material (e.g., cement C) in the hopper is discharged into the mixer. The mixer is then operated to mix the aggregate G and other ingredients to create the concrete or mortar mixture.

FIGS. 7-10 illustrate a hopper 125 according to a second embodiment of the invention. In one embodiment, the hopper 125 is for supplying aggregate (e.g., sand) to a mortar mixer M. The hopper 125 is similar to the hopper of the first embodiment but is smaller and is mounted on a freestanding support 127 that supports the hopper at a fixed elevation above the ground, or the hopper can be mounted to the mixer M. The hopper 125 has a body 131 with an open top and a plurality of walls including a bottom wall 135, a first side wall 137, a second side wall 139, a back wall 141, and a front wall 143. In the illustrated embodiment, the hopper 125 includes a handle 145 attached to the first and second side walls 137, 139 and located adjacent the back wall 141 of the body 131. The hopper 125 has pivot shafts 149, 151 respectively attached to the first and second side walls 137, 139 and extending outward therefrom. In the illustrated embodiment, the pivot shafts 149, 151 are stub shafts axially aligned along a pivot axis A2 (FIG. 10) of the hopper. Each pivot shaft 149, 151 is respectively rotatably attached to a support leg 155, 157 of the support 127 so that the hopper 125 can be pivoted about the pivot axis to discharge aggregate (e.g., sand) from the hopper.

Figure 10:
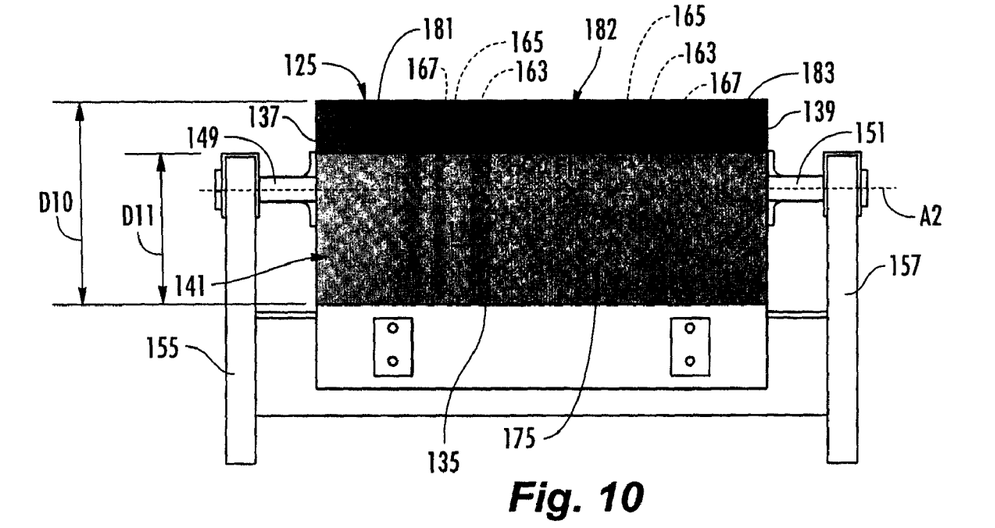
FIG. 10 is end view of the hopper of FIG. 7.

The hopper 125 has two guides 163 respectively extending between the back wall 141 and the front wall 143 of the body 131. The guides 163 are generally parallel to the first and second side walls 137, 139. The guides 163 have a top surface 165 spaced above the bottom wall 135 a first distance D10 and a bottom surface 167 spaced above the bottom wall a second distance D11. In the illustrated embodiment, the top surfaces 165 of the guides are aligned with the top surfaces 169, 171 of the side walls 137, 139, but the guides may be otherwise positioned in the hopper 125 without departing from the invention. As shown in FIG. 10 the back wall 141 includes an indicator 175 for indicating the fill level of the hopper 125 corresponding to a predetermined volume of sand. In the illustrated embodiment, the indicator 175 comprises two colored segments 179, 181 on the external surface of the back wall 141 and respective volume indicia 180, 182 corresponding to the predetermined volume of each colored segment. The colored segments 179, 181 include contrasting colors so that the demarcation line 183 between the two segments is clearly indicated. In the illustrated embodiment, the first lower segment 179 comprises the portion of the surface area of the back wall 141 below the bottom surfaces 167 of the guides 163. The second upper segment 181 includes the upper portion of the back wall 141 above the bottom surfaces 167 of the guides 163. In the illustrated embodiment, a fill level corresponding with the line of demarcation 183 between the first and second segments 169, 171 of the indicator 175 indicates that a volume of approximately 1 cu. Ft. of sand is in the hopper. In the illustrated embodiment, a fill level corresponding to the top surfaces 169, 171 of the side walls 137, 139 and the top surfaces 165 of the guides 163 indicates that a volume of approximately 1½ cu. Ft. of sand is in the hopper. In the illustrate embodiment, the distance D10 from the bottom surfaces 167 of the guides 163 to the bottom wall 135 is approximately 8 inches and the distance D11 from the top surfaces 165 of the guides (and the top surfaces 169, 171 of the side walls) to the bottom wall is approximately 10½ inches. As with the previous embodiment, the size of the hopper 125 and the size, location, quantity, etc. of the guides 163 may vary without departing from the invention.

The hopper 125 of the second embodiment is used in a similar manner as the hopper 1 of the first embodiment. The hopper 125 is manually filled with sand (e.g., by shoveling) so that the hopper is overfilled with sand. The fill level of the sand in the hopper 125 is reduced to a level corresponding with the desired predetermined volume of sand. Alternatively, the hopper 125 may be initially filled to the desired fill level without the need for reducing the fill level of the hopper. In the second embodiment, the hopper 125 is stationary and is typically located adjacent a batch mixer M that receives the ingredients of the mortar or concrete mixture. After filling the hopper 125 to the desired fill level, the hopper is pivoted by grasping the handle 145 and pivoting the hopper forward to discharge the sand into the mixer M. The mixer M combines the sand with the other ingredients to create a mixture suitable for use as mortar or concrete.

It will be further understood by those skilled in the art that while the foregoing has been disclosed above with respect to preferred embodiments or features, various additions, changes, and modifications can be made to the foregoing invention without departing from the spirit and scope thereof.

The foregoing description of the invention illustrates and describes various embodiments and features of the present invention. As various changes could be made in the above construction without departing from the scope of the invention, it is intended that all matter contained in the above description or shown in the accompanying drawings shall be interpreted as illustrative and not in a limiting sense. Furthermore, the scope of the present invention covers various modifications, combinations, alterations, etc., of the above-described embodiments that are within the scope of the claims. Additionally, the disclosure shows and describes only selected embodiments and features of the invention, but the invention is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the invention without departing from the scope of the invention.

What is claimed is:

1. A hopper for measuring a predetermined amount of aggregate, the hopper comprising:
   a body having an open top and a plurality of walls, the plurality of walls comprising a bottom wall, a first side wall, a second side wall, a front wall, and a back wall;
   at least one guide extending between at least two of the plurality of walls, and having a top surface at a first elevation and a bottom surface at a second elevation;
   at least one indicator to provide an indication within the hopper of at least a first predetermined volume of aggregate when the hopper has a fill level approximately aligned with the top surface of the guide and to provide indication that the hopper contains a second predetermined volume of aggregate when the hopper has a fill level approximately aligned with the bottom surface of the guide.

2. The hopper of claim 1 wherein the indicator comprises a first indicia on at least one of the walls and a second indicia on the at least one wall.

3. The hopper of claim 2 wherein the first and second indicia comprise colored segments on an outside surface of the at least one wall.

4. The hopper of claim 3 wherein the indicator further comprises a line of demarcation between the colored segments.

5. The hopper of claim 4 wherein the line of demarcation is at an elevation above the bottom wall equal to an elevation of the bottom surface of the at least one guide.

6. The hopper of claim 1 wherein the at least one guide extends between the front and back walls and is generally arranged parallel to the side walls.

7. The hopper of claim 6 wherein the at least one guide comprises an upper guide and a lower guide, the upper guide being vertically spaced from a lower guide so that each of the upper and lower guides has a top and a bottom surface that respectively indicates a first and a second predetermined volume.

8. The hopper of claim 1 wherein the at least one guide includes an indicator on at least a portion of a surface of the guide above the side walls, the indicator comprising at least one indicia indicating a predetermined volume of aggregate based on a fill level of aggregate at an elevation above the top surface of the side walls of the hopper.

9. The hopper of claim 1 wherein the bottom wall and the back wall are orthogonal.

10. The hopper of claim 1 further comprising a bracket attached to the back wall for attaching the hopper to a loading device.

11. The hopper of claim 1 wherein the hopper is rotatably attached to a support.

12. The hopper of claim 11 wherein the support is a free standing support for supporting the hopper at an elevation above the ground.

13. The hopper of claim 12 wherein the support includes a series of support legs, with the hopper being rotatably mounted between the support legs.

14. The hopper of claim 11 wherein the support is attached to a mixer.

15. A hopper for measuring a predetermined amount of aggregate, the hopper comprising:
    a body having an open top and a plurality of walls, the plurality of walls comprises a bottom wall, a first side wall, a second side wall, a front wall, and a back wall;
    at least two guides extending between the back wall and the front wall, the guides being generally in a parallel planar relationship and being vertically aligned in the hopper, the guides each having a top surface at a first elevation and a bottom surface at a second elevation;
    at least one indicator provided along one of the first and second side walls, the indicator comprising at least two colored segments on an outside surface of the side wall and a line of demarcation between the colored segments, the line of demarcation being at an elevation above the bottom wall even with the bottom surfaces of the at least two guides for indicating that the hopper contains a first predetermined volume of aggregate when the hopper has a fill level even with the line of demarcation.

16. The hopper of claim 15 wherein at least two guides are upper guides.

17. The hopper of claim 16 further comprising lower guides at an elevation below the upper guides.

18. The hopper of claim 16 wherein the at least two colored segments comprise four colored segments.

* * * * *